United States Patent [19]

Onoda et al.

[11] Patent Number: 4,644,367
[45] Date of Patent: Feb. 17, 1987

[54] RECORDING PEN APPARATUS

[75] Inventors: Hiroshi Onoda; Kenji Mizuno, both of Nagoya, Japan

[73] Assignee: Brother Kogyo Kabushiki Kaisha, Aichi, Japan

[21] Appl. No.: 675,654

[22] Filed: Nov. 28, 1984

[30] Foreign Application Priority Data

Nov. 30, 1983 [JP] Japan ............................. 58-226481

[51] Int. Cl.⁴ ..................... G01D 9/38; B43I 11/00; B41J 5/30; G05B 19/19
[52] U.S. Cl. .................... 346/33 R; 346/136; 346/139 R; 364/520; 400/279; 400/17; 400/18
[58] Field of Search ............ 346/139 B, 139 R, 136, 346/33 R; 33/18 B, 18 R; 400/17, 18, 76, 279; 364/520

[56] References Cited

U.S. PATENT DOCUMENTS

| | | | |
|---|---|---|---|
| 4,086,660 | 4/1978 | McBride | 364/900 X |
| 4,311,399 | 1/1982 | Wegryn et al. | 400/76 |
| 4,346,445 | 8/1982 | Levenberger et al. | 364/520 X |
| 4,467,525 | 8/1984 | Logan et al. | 33/18 B |

Primary Examiner—E. A. Goldberg
Assistant Examiner—Gerald E. Preston
Attorney, Agent, or Firm—Parkhurst & Oliff

[57] ABSTRACT

A recording apparatus for recording graphs or other graphical representations, with relative movements between a writing instrument on a carriage which is moved by a carriage drive unit, and a sheet of paper which is fed by a paper feed unit in opposite directions perpendicular to the line of movements of the carriage. The writing instrument is moved between a recording position, and a non-recording position in which the writing instrument is spaced away from the paper. The apparatus comprises a controller for activating the paper feed unit and carriage drive unit to effect relative non-recording movements of the writing instrument and the paper with the writing instrument held in the non-recording position. The paths of the non-recording movements are determined based on input recording data so as to indicate a recording area in which the graphical representation is drawn by the writing instrument, whereby the operator can check dimensions and location of the recording area before the graphical representation is actually drawn on the paper.

6 Claims, 15 Drawing Figures

S22: BROKEN-LINE GRAPH?
S23: GRAPH DRAWING COMPLETED?
S25: GRAPH DRAWING COMPLETED?
S27: HATCHING?

RECORDING PEN APPARATUS

BACKGROUND OF THE INVENTION

The present invention generally relates to a recording device for drawing graphs, pictures and the like on a recording paper or other medium, by moving suitable drawing means relative to the recording paper with the writing tip held in contact with the paper. More particularly, the invention is concerned with such type of recording device equipped with a controller which permits easy checking of a recording range on the recording paper prior to an actual recording operation.

There have been known recording devices which are equipped with: a recording paper feeder for feeding in the vertical direction a sheet of paper supported on a paper support or platen; a carriage for supporting a writing instrument and movable in a direction perpendicular to the feeding direction of the recording paper; a carriage drive unit for driving the carriage; and a drive unit for selectively locating the writing instrument at a recording position wherein the writing instrument contacts the recording paper, or at a non-recording position wherein the writing instrument is separated or spaced from the recording paper. Such a recording device performs a recording operation by bringing the writing instrument into contact with the recording paper and moving the carriage and the recording paper relative to each other. In this way, graphs, pictures and other graphical representations are drawn on the recording paper, based on recording data entered for the recording operation. However, a positional relationship between a graphical representation to be drawn and characters, or other graphical representations already drawn on the recording paper is unknown to the operator before a recording operation is actually effected. Thus, the known recording device or apparatus suffers the possibility that the actually drawn graph, picture or the like may interfere with lines of characters, or other graphical figures, or spaces between the adjacent recordings are insufficient.

SUMMARY OF THE INVENTION

It is accordingly an object of the present invention to provide a recording apparatus which has provisions for easy checking of a recording area prior to an actual recording operation to effect recording in the recording area.

According to the present invention, there is provided a recording apparatus having a paper support for supporting a recording sheet of paper, a paper feeder for feeding the sheet of paper in opposite directions, a carriage supporting a writing instrument and movable in a direction perpendicular to a line of feed of said sheet of paper, a carriage drive unit for moving the carriage in said direction, a writing-instrument drive unit for moving the writing instrument between a recording position in which the writing instrument is in contact with the surface of the sheet of paper, and a non-recording position in which the writing instrument is spaced away from the surface of the paper, and a control unit for drawing a graphical representation by means of relative movements of the carriage and the sheet of paper with the writing instrument held in the recording position, based on input recording data, wherein the improvement comprises: said control unit including control means for activating the paper feeder and carriage drive unit, to effect relative non-recording movements between the writing instrument and the sheet of paper with the writing instrument held in the non-recording position, paths of the relative non-recording movements being determined based on the input recording data so as to indicate a recording area in which the graphical representation is drawn by the writing instrument, whereby the operator can check dimensions and location of the recording area before the graphical representation is actually drawn on the sheet of paper.

In the recording apparatus constructed as described above, the control means activates the paper feeder and carriage drive units with the writing instrument placed in the non-recording position, so as to effect the non-recording movements of the writing instruments relative to the paper prior to starting an actual recording operation to record a graphical representation based on input recording data. By observing the relative non-recording movements, the operator may easily check for the possibility of whether or not a graphical representation to be recorded based on the recording data interferes with already recorded characters or other graphical representations, and whether there is provided sufficient spaces around the graphical representation to be recorded. Thus, the recording apparatus of the invention has provisions for enabling the operator to know the dimensions and location of a recording area in which a graph or other graphical figure is plotted. Consequently, the instant recording apparatus requires no trial recording on a recording medium.

According to one embodiment of the invention, a mode selector key is provided for selecting a writing mode in which characters are written by the writing instrument, or a recording mode in which the graphical representation is drawn. Further, a check key is provided for effecting the relative non-recording movements of the writing isntrument and the paper. In this instance, the control means is responsive to the operation of the check key in the recording mode, and activates the paper feeder and carriage drive unit for effecting said relative non-recording movements.

In accordance with another embodiment of the invention, the control means comprises storage means for storing the input recording data, and means for preparing based on the stored input recording data non-recording data representative of said relative non-recording movements.

The paths of said relative non-recording movements may be taken along a diagonal line of a rectangle which encloses said recording area, or along four sides of the rectangle. Alternatively, the non-recording feed paths may be taken along two adjacent sides of the rectangle, which two sides define at their intersecting point an origin of recording of the graphical representation.

According to a further embodiment of the invention, the recording apparatus further comprises a graph type selector key for selecting one of plural types or patterns of graphs including a pie chart. When the pie chart is selected by the graph type selector key, the control means controls the paper feeder and carriage drive unit such that the non-recording feed paths comprise a first path along a straight line connecting an origin of recording and a center of the pie chart, a second path along a straight line connecting the center and a point on the circumference of the pie chart, and a third path along the circumference of a the pie chart.

According to a still further embodiment of the invention, the control means controls the paper feeder and the carriage drive unit such that the non-recording movements are paths which are taken when the graphical representation is actually drawn based on the input recording data.

BRIEF DESCRIPTION OF THE DRAWINGS

The above and other objects, features and advantages of the present invention will become more apparent from reading the following description of the preferred embodiments taken in connection with the accompanying drawings in which.

DETAILED DESCRIPTION OF THE PREFERRED EMBODIMENT

Figure 1:
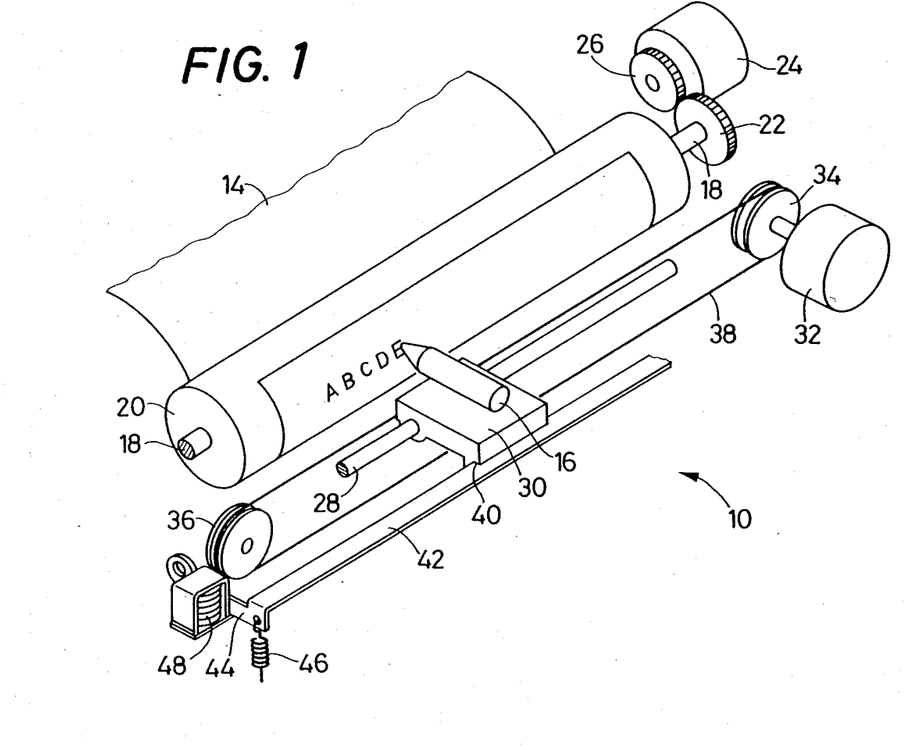
FIG. 1 is a perspective view of one form of a recording mechanism of a ball-point pen type recording apparatus according to the invention.
Figure 2:
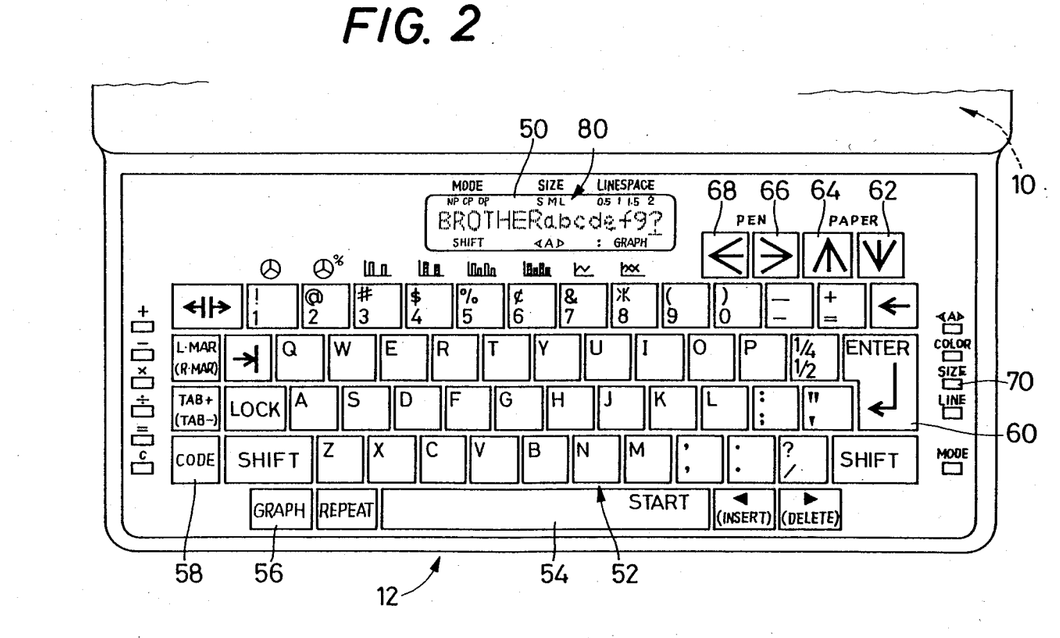
FIG. 2 is a plan view of one form of a keyboard assembly of the ball-point pen type recording apparatus shown in FIG. 1.

There are shown in FIGS. 1 and 2, respectively, a recording mechanism 10 and a keyboard assembly 12 of a ball-point pen type recording apparatus to which the invention is applied. The recording mechanism 10 is provided in the same frame as the keyboard assembly 12, and disposed adjacent to and at the back of the keyboard assembly 12.

The recording mechanism 10 writes or draws characters, symbols, figures, graphs, pictures and the like on a recording medium in the form of a sheet of paper 14 by bringing a ball-point pen 16 serving as a writing or drawing instrument into contact with the recording paper 14 and then moving the ball-point pen 16 and the recording paper 14 relative to each other. More particularly described, a platen 20 of circular shape in cross section is concentrically secured to a horizontal platen shaft 18 which is rotatably supported by shaft supporters (not shown), and a platen gear 22 is fixed to one end of the platen shaft 18. This platen gear 22 is engaged with a motor gear 26 fixed to an output shaft of a paper feeding stepping motor 24. When the platen 20 is rotated by the stepping motor 24, the recording paper 14 set on the platen 20 is fed in the vertical direction. In other words, the platen 20 and the stepping motor 24 constitute a recording paper feeder of this preferred embodiment.

In front of the platen 20, a guide rod 28 of circular shape in cross section is fixed to the frame (not shown) parallel to the rotating axis of the platen 20, and a carriage 30 fixedly carrying the ball-point pen 16 is supported by the guide rod 28 so that it is movable in an axial direction of the guide rod 28 and pivotable about the guide rod 28. A drive pulley 34 fixed to an output shaft of a stepping motor 32 and an intermediate pulley 36 are connected by a wire 38 in the form of a loop extending parallel to the guide rod 28. With the carriage 30 fixed to the wire 38, the carriage 30 is driven perpendicular to the feeding direction of the recording paper 14. Namely, the wire 38 and the stepping motor 32 form a carriage drive unit of this preferred embodiment.

A front end portion 40 of the carriage 30 is slidably in contact with and supported by a guide plate 42 which is disposed in front of and parallel to the guide rod 28. When the guide plate 42 moves up and down in the vertical direction, the carriage 30 is pivoted about the guide rod 28. The guide plate 42 is provided with a pair of arms 44 which are pivotally supported on the frame (not shown). Each end of the guide plate 42 has a return spring 46 between the arm 44 and the frame so that the guide plate 42 is always biased downwardly by the return spring 46. Each arm 44 is connected with a solenoid 48 which drives the guide plate 42 in a direction opposite to the direction in which the guide plate 42 is biased by the return spring 46. Therefore, the front end portion 40 of the carriage 30 is normally located in its lower position so that a front end portion of the ball-point pen 16 is separated from the recording paper 14. When the solenoids 48 are activated to drive the arms 44 to their upper positions, the ball-point pen 16 is pressed against the recording paper 14. That is, the guide plate 42, the arms 44 and the solenoids 48 of the preferred embodiment constitute a drive unit for activating the writing instrument.

On the keyboard assembly 12 described above, there are disposed a liquid crystal display 50 and a multiplicity of input keys. The input keys comprise character keys 52 corresponding to alphabets, numerals and symbols, a space key 54, a graph key 56, a code key 58, a carriage return key 60, paper feed keys 62 and 64, pen travel keys 66 and 68, a size key 70 and other keys. The aforementioned graph key 56 is used to select a mode of the recording apparatus. The modes available are a normal writing mode for writing characters and a graph mode for drawing a graph. By operating one of the character keys 52 imprinted with numerals "1" through "8" in the graph mode, a type of graph such as a pie chart, a bar graph or a broken-line graph is selected.

Figure 3:
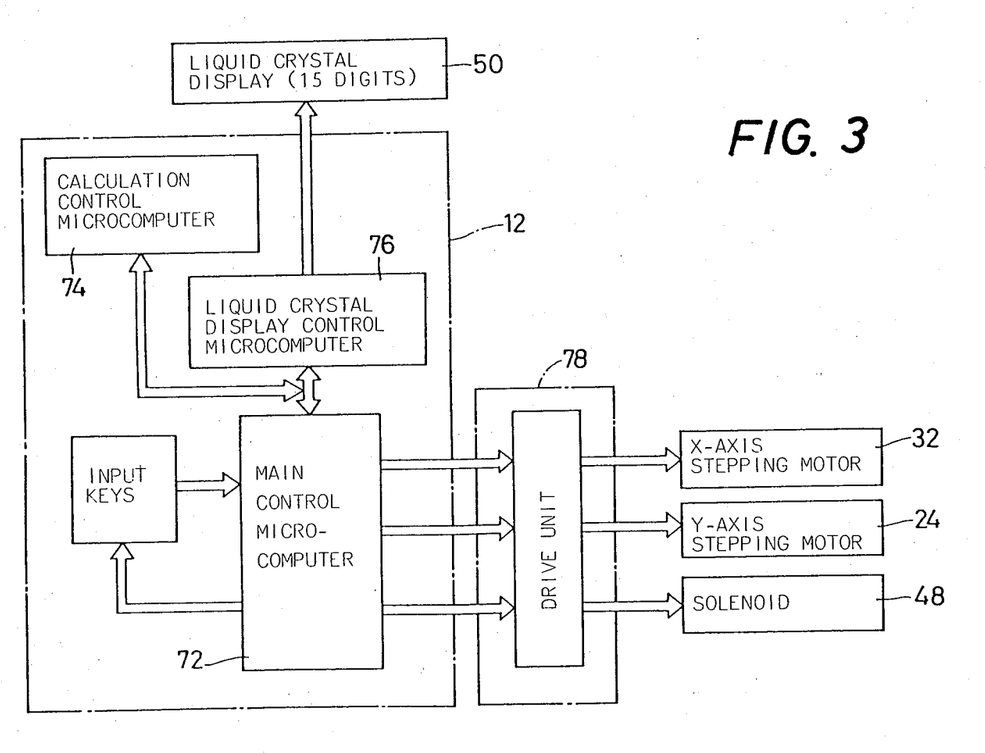
FIG. 3 is a block diagram illustrating a control system of the ball-point pen type recording apparatus shown in FIGS. 1 and 2.

The ball-point pen type recording apparatus constructed as described above is provided with a control system shown in FIG. 3. The above mentioned keyboard assembly 12 accommodates a main control microcomputer 72 serving as a controller and a calculation control microcomputer 74 and a liquid crystal display control microcomputer 76. The main control microcomputer 72 processes signals sent from input keys according to a program stored in its ROM through utilization of a temporary storage function of its RAM, and also causes the calculation control microcomputer 74 to perform a calculating operation, and the liquid crystal display control microcomputer 76 to display characters or indexes in the liquid crystal display 50. The main control microcomputer 72 sends drive signals to the X-axis stepping motor 32, the Y-axis stepping motor 24 and the solenoids 48 via a drive unit 78, and controls the above indicated components at predetermined timings.

Figure 4A:
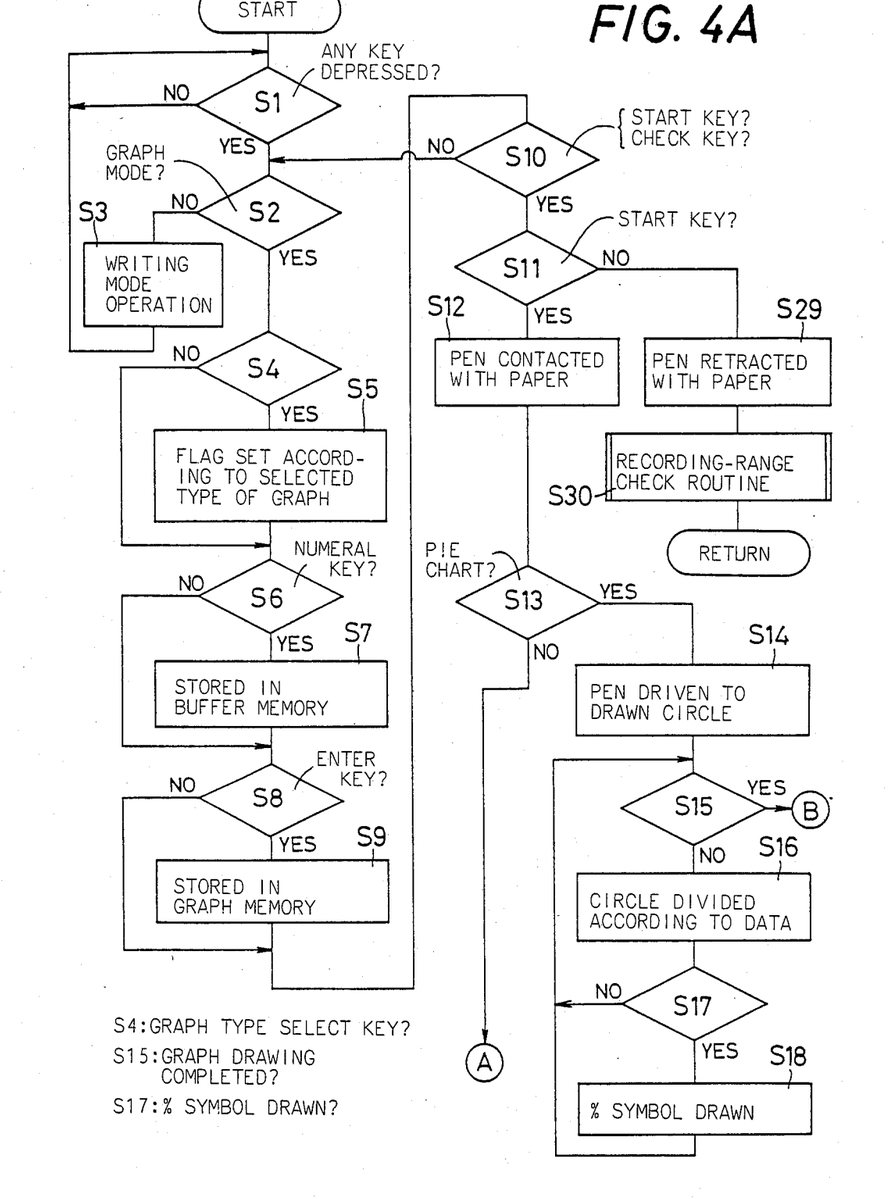
FIGS. 4A, 4B and 5 are flowcharts showing the operation of the recording apparatus of FIGS. 1 and 2.
Figure 4B:
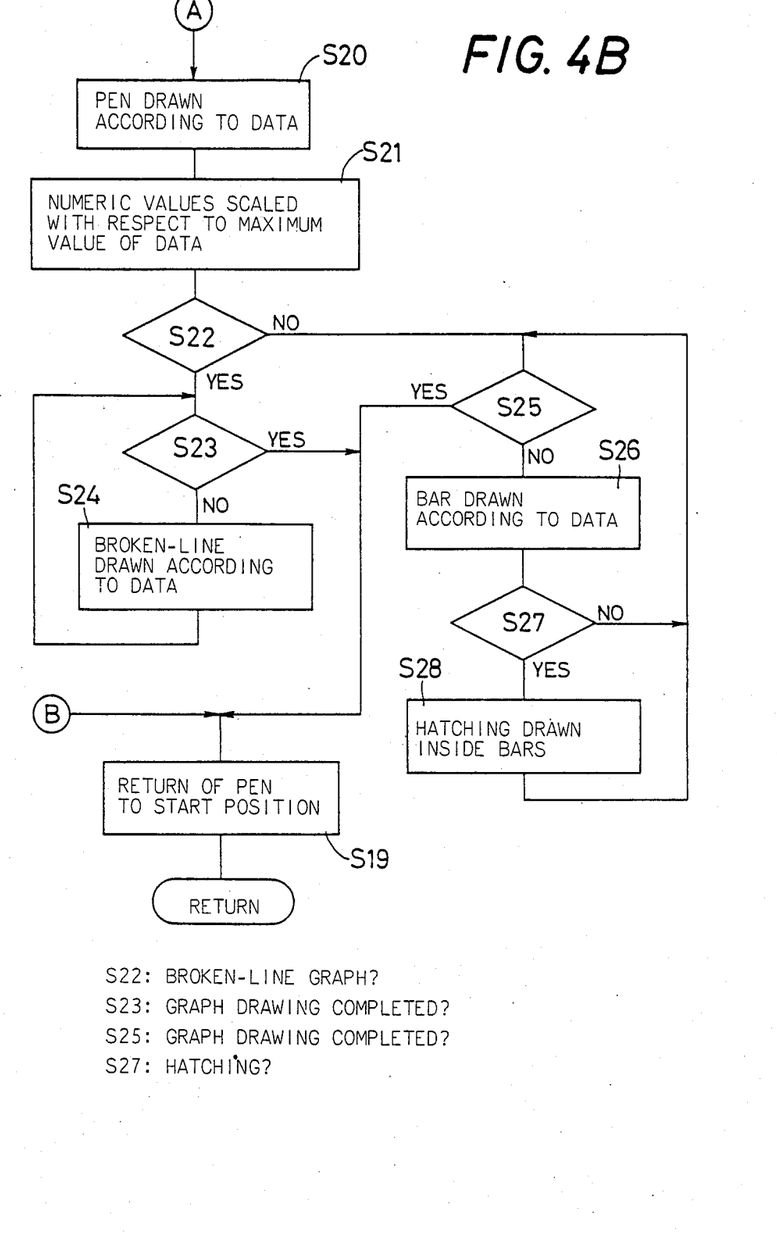

An operating sequence of the preferred embodiment will be explained, referring to a flowchart in FIG. 4.

A step S1 is first executed to judge whether or not any of the input keys disposed on the keyboard assembly 12 has been pressed. When the key has not been pressed, the step S1 is executed again. When the key has been pressed, a step S2 is executed to judge whether or not the graph mode has been selected, i.e., whether or not the graph key 56 has been pressed. When the graph mode has not been selected, a normal writing mode operation in a step S3 is effected, and characters, numerals and/or symbols are written on the recording paper 14 in response to operations of the character keys 52. When the graph mode has been selected, a step S4 is executed to judge whether or not any of the graph type select keys has been pressed. As indicated above, the graph key 56 serves as a mode selector key. The character keys 52 imprinted with numerals "1" through "8" act as graph type selector keys for selecting one of eight graph types when the graph mode is selected, and a graph select message is displayed on the liquid crystal display 50. for example, when the character key 52 imprinted with "1" is pressed, a circle graph or pie chart is selected. When the character key 52 imprinted with "3" is pressed, a bar graph is selected, and when the key 52 with "5" is pressed, a graph of broken line is selected. When any of the graph type select keys is judged to have not been pressed in the step S4, a step S5 is skipped. When the graph type select key is judged to have been pressed in the step S4, the step S5 is executed and a flag corresponding to the selected type of graph is set. A step S6 is then executed to judge whether or not the pressed key is a numeral keys. When the pressed key is not a numeral keys, a step S7 is skipped. When a numeral key is pressed, the step S7 is executed and the numeric value corresponding to the pressed numeral key is stored in a buffer memory. This data entered through the numeral key is effective when the numeral key is pressed alone after the desired graph is selected in the graph mode. A step S8 is then executed to judge whether or not an enter key has been pressed. The carriage return key 60 is referred to as the enter key in the graph mode. When the enter key (carriage return key) 60 has not been pressed, a step S9 is skipped. When the enter key 60 has been pressed, the numerical value stored in the buffer memory is stored in a graph memory which serves as recording data storage means for storing plural sets of numerical data that are presented as a graph.

A step S10 is then executed to judge whether or not a start key or a check key has been pressed. In the graph mode, the space key 54 is referred to as the start key, and the space key 54 and code key 58, when concurrently depressed, serve as the check key. When neither of the start key and check key are judged to have been pressed in the step S10, the step S2 and following steps are executed repeatedly. When one of the above mentioned keys is judged to have been pressed, a step S11 is executed to judge whether or not the start key has been pressed. When the start key is judged to have been pressed in the step S11, recording is initiated. When the start key is judged to have not been pressed that is, if the check key has been pressed, a non-recording feed operation is initiated. Assuming that the start key is judged to have been pressed in the step S11, a step S12 is executed, whereby the solenoids 48 are activated and the front end portion of the carriage 30 is lifted by the guide plate 42, whereby the carriage 30 is inclined rearwardly and the front end portion of the ball-point pen 16 is brought into contact with the recording paper 14. In this state, a step S13 is executed to judge whether the pie chart has been selected or not on the basis of the flag set in the preceding step S5. When the pie chart is judged to have been selected, a step S14 is executed, whereby the carriage 30 and the platen 20 are driven by the stepping motors 32 and 24, respectively, according to the recording data (numerical data in the graph memory), and the ball-point pen 16 and the recording paper 14 are moved relative to each other. Basic pie chart pattern data stored in the ROM is representative of a circle which has a diameter corresponding to the desired size selected by the size key 70. This basic pattern data is modified according to a magnification command from the size key 70. Described in more detail, a step S14 is executed wherein a magnification size S, M or L which is selected by the size key 70 is indicated by appropriate indexes 80 on the liquid crystal display 50, which indexes 80 are selectively indicated each time the size key 70 is pressed. When the size M is displayed, a circle is drawn with a diameter twice as large as that of the size S. When the size L is displayed, a circle with a diameter twice as large as that of the size M is drawn. A step S15 is then executed to judge whether or not the pie chart has been completed. However, since the recording of the pie chart is not completed by the drawing of the circle, the next step S16 is executed to divide the circle according to the input data. That is, since plural sets of numeric data for drawing the desired pie chart are stored in the above mentioned graph memory, the circle is divided by radial lines according to the first numeric value in the graph memory, and the numeric value is written inside the area defined by the radial lines. A step S17 is then executed to judge whether percent symbols are required or not, i.e., to judge whether or not the pie chart with percent symbols has been selected by pressing the character key 52 corresponding to numeral "2". When the percent symbols are not required, the steps S15 and S16 are executed again to further divide the circle. When the percent symbols are required, a step S18 is executed to print a % symbol following the numeric value drawn inside the divided circle. After the step S18 has been executed, the steps S15 and S16 are executed again. When the pie chart is judged to have been drawn through repeated executions of the above indicated steps, a step S19 is executed following the step S15, whereby the solenoids 48 are deenergized to separate the ball-point pen 16 from the recording paper 14, and the stepping motors 24 and 32 are driven to return the ball-point pen 16 to an origin G wherein it has been located before the start of the recording operation.

When the pie chart is judged to have not been selected in the above described step S13, this means that the bar graph or the graph of broken line has been selected. Therefore, a step S20 is executed, and an axis of ordinate or vertical axis (Y axis) and an axis of abscissa or horizontal axis (X axis) of the bar graph or broken-line graph are drawn. The basic pattern data stored in the ROM comprise data representative of a dimension of the ordinate axis and the first recording position (first bar position) along the abscissa axis. The length of the abscissa axis is calculated according to the number of numerical values entered in the graph mode and stored in the graph memory, and the abscissa axis is drawn to that length in the step S20. A step S21 is then executed to calibrate the ordinate axis based on the maximum value of the data stored in the graph memory, and the values of calibrations are written along the ordinate axis. A step S22 is then executed to judge, based on the flag set in the step S5, whether or not the broken-line graph has been selected. Assuming that the broken-line graph is judged to have been selected, a step S23 is executed to judge whether or not the broken-line graph has been completed. Normally, since the recording of the graph is not completed by the drawing of the ordinate and abscissa axes, steps S23 and S24 are executed repeatedly to draw broken lines in due order according to the sets of data stored in the graph memory. When the graph is judged to have been drawn by repeated execution of the steps S23 and S24, the step S19 is executed following the step S23 to return the ball-point pen 16 to the origin G as described above. On the other hand, when the broken-line graph is judged to have not been selected in the aforementioned step S22, it means that the bar graph has been selected. Therefore, a step S25 is executed to judge whether or not the graph has been completed. Since the drawing of the graph is not completed by the recording of the ordinate and abscissa axes, a step S26 is executed, whereby a bar is drawn with a length corresponding to the first value stored in the graph memory. A step S27 is then executed to judge whether or not hatching is required inside the bar, i.e., to judge whether or not the bar graph with hatching has been selected by pressing the character key 52 corresponding to numeral "6" when hatching is judged to be unrequired, the steps S25 and S26 are executed repeatedly to draw bars corresponding to the second and subsequent numerical values stored in the graph data. When hatching is judged to be required, a step S28 is executed, whereby the drawn bar is hatched and then the steps S25 and S26 are executed repeatedly. When the graph is judged to have been completed, the above indicated step S19 is executed following the step S25 to return the ball-point pen 16 to the origin G. In the sequence of operation as described above, the ball-point pen type recording apparatus draws a desired type of graph based on the input data.

Prior to the recording operation, however, it is difficult for the operator to correctly grasp an actual size of a graph to be drawn. Therefore, in order to prevent the graph to be plotted from interfering with a group of characters and/or a picture or pictures already drawn on the recording paper 14, it is desired to check, in advance, the actual size of the graph to be plotted. To check the actual size of the graph, the operator activates the check key concurrently with the code key 58 and the space key 54 prior to a depression of the start key (space key) 54 in the step S11. Since the start key is judged to have not been pressed in the above mentioned step S11, a step S29 is executed, whereby the solenoids 48 are kept deenergized and the front end of the ball-point pen 16 remains separated or spaced from the recording paper 14. A routine for checking the range of recording is then executed in a step S30.

Figure 5:
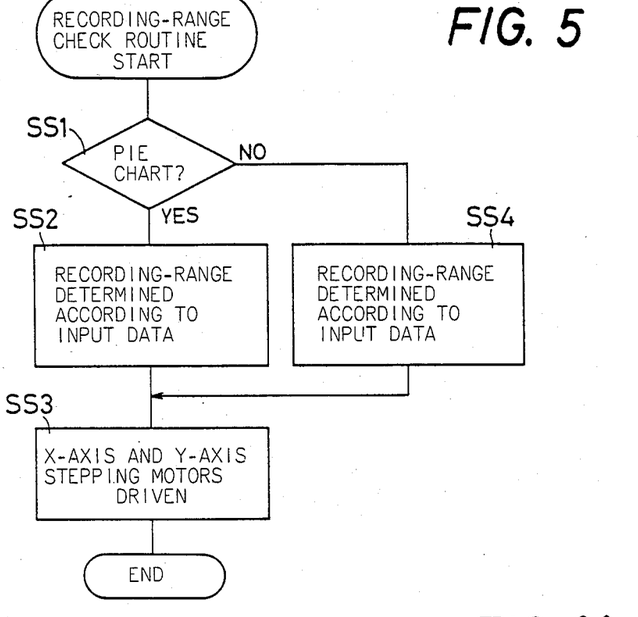
Figure 6:
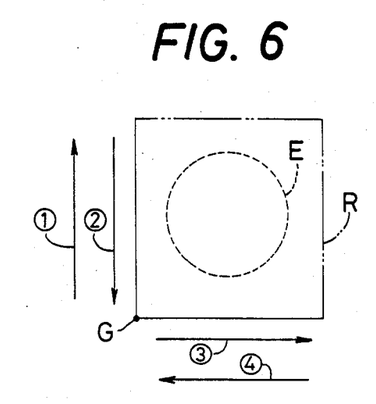
FIGS. 6 through 13 are examples of non-recording feed operation of the recording apparatus of FIGS. 1 and 2.
Figure 7:
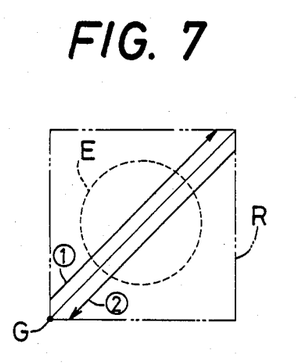
Figure 8:
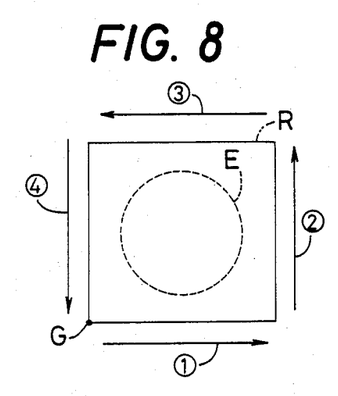
Figure 9:
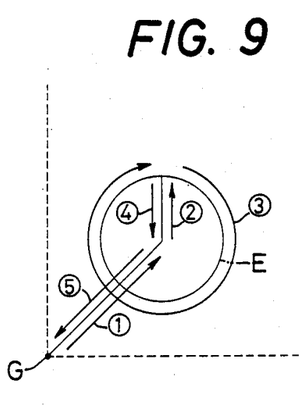

The recording range check routine in the step S30 is constructed as shown in FIG. 5. Namely, a step SS1 is first executed to judge whether or not the pie chart has been selected with the flag set in the above described step S5. When the pie chart has been selected, a step SS2 is executed to determine the recording range according to the input data. As described above, since the ROM stores the data (algorithm) for drawing the basic pattern of the pie chart E and the data (algorithm) for calculating a rectangular recording range R as shown in FIG. 6, so that the rectangle R fully covers the maximum values in the X and Y directions of the pie chart E which is actually drawn with a diameter corresponding to a size selected by the size key 70, i.e., the rectangle R (recording range) has the origin G of the ball-point pen 16 at a bottom left corner thereof as shown in FIG. 6, and fully encloses the above indicated pie chart E. To represent the size of the rectangle R, non-recording data for moving the front end of the ball-point pen 16 along two sides of the rectangle R adjacent to the origin G is prepared. The step SS2 is followed by a step SS3, wherein the X-axis stepping motor 32 and the Y-axis stepping motor 24 are driven based on the non-recording data prepared in the step SS2 to move the front end of the ball-point pen 16 along the aforementioned two sides. Solid lines in FIG. 6 represent paths taken by the front end of the ball-point pen 16, and encircled numbers indicate the order in which the ball-point pen 16 is moved. As mentioned above, the two sides of the rectangle R are indicated by the non-recording feed paths of the ball-point pen 16. By observing these paths of the pen 16 prior to the actual recording operation, the operator can confirm that the rectangle R which encloses the pie chart does not interfere with the already written or drawn characters and/or graphical figures. The paths to be taken by the pen 16 according to the non-recording data prepared in the step SS2 may be a diagonal line or four sides of the rectangle R as shown in FIGS. 7 and 8. Further, it is possible that the non-recording data be prepared such that the pen 16 is moved from the origin G to the center of the pie chart E, then from the center of the circle to the top point on the circumference of the circle, and along the circumference of the circle back to the top point on the circumference, from which the pen 16 is moved back to the origin G via the center of the circle, as shown in FIG. 9 by arrows indicated by encircled numbers 1 through 5. In this connection, it is noted that the solid lines of FIG. 8 numbered 1 through 4 representing the paths of the pen 16 actually coincide with the four sides of the rectangle R, and that the solid line of FIG. 9 representing the third circular path of the pen 16 actually coincides with the circumference of the pie chart E.

Figure 10:
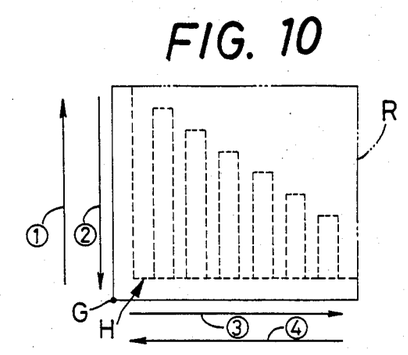
Figure 11:
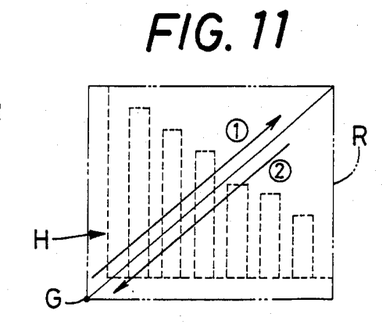
Figures 12, 13:
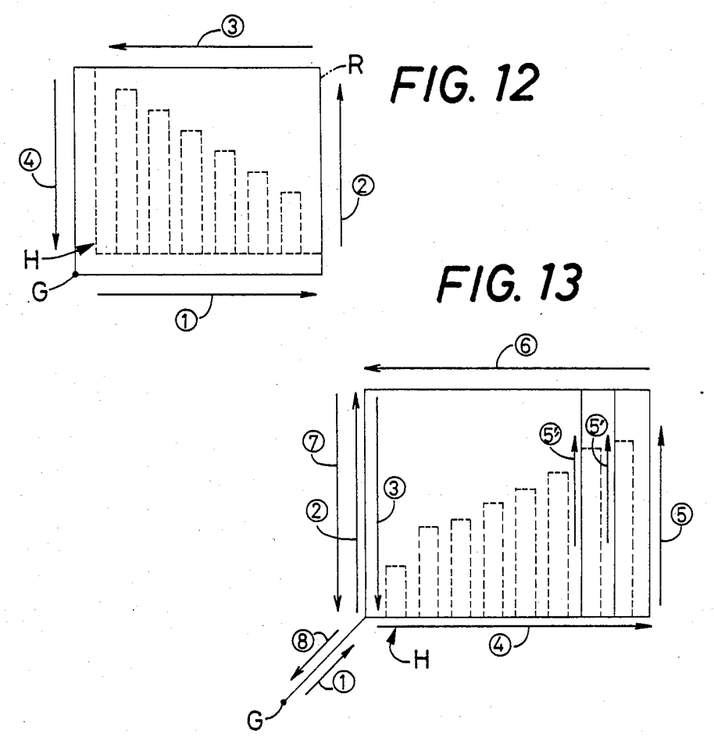

On the other hand, when the pie chart is judged to have not been selected in the step SS1, that is, the bar graph or the broken-line graph has been selected, a step SS4 is executed to determine the recording range according to the input data. As previously stated, the ROM stores the basic pattern data which includes data representing the length of the ordinate axis of the bar or broken-line graph and the first recording distance along the abscissa axis (X-axis) from the ordinate axis as mentioned above, and the length of the abscissa axis is calculated according to the number of input data. Then, the recording range is determined such that the rectangle R encloses the bar graph or the broken-line graph H, and such that the bottom left intersecting point of two sides thereof is the recording origin G. The non-recording data for driving the X-axis stepping motor 32 and the Y-axis stepping motor 24 is prepared according to the determined rectangle R. Examples of paths of the pen 16 according to such non-recording data are shown in FIGS. 10-13, in arrowed solid lines. In the example of FIG. 10, the non-recording data is prepared so that the pen 16 is moved along the two sides in both directions, beginning at the origin G of the rectangle R. In the example of FIG. 11, the ball-point pen 16 is moved along a diagonal line beginning at the origin G of the rectangle R. In the example of FIG. 12, the ball-point pen 16 is moved along four sides of the rectangle R. In the example of FIG. 13, data for moving the ball-point pen 16 is prepared such that the pen 16 is moved from the origin G to an intersecting point of the ordinate and abscissa axes of the bar graph or broken-line graph H and further along the four sides of the rectangle R in which the graph H is drawn. A step SS3 is then executed to effect the non-recording feed operation of the ball-point pen 16 in the order shown by arrows in FIGS.

10 through 13. When the number of data entered through the numeral keys is different from one graph to another, the number of bars is changed as shown in FIG. 13. For example, the path indicated by arrow 5 is replaced by arrow 5' or 5" to change the non-recording feed distance in the directions corresponding to arrows 4 and 6. In the instant embodiment, the steps SS2 and SS4 constitute means for preparing non-recording data.

As described above, in the preferred embodiment of the present invention, when the check key is pressed, that is the code key 58 and the space key 54 are concurrently pressed prior to the actual recording operation, the rectangle R or the circle E enclosing or defining the graph to be drawn is indicated by the non-recording feed paths taken by the ball-point pen 16. During the non-recording feed operation, therefore, the operator can check the possibility of interference of the graph with, or a space from, the characters or picture already drawn on the recording paper 14. If the operator finds, during the non-recording feed operation, that the position of the graph to be drawn is not appropriate, the operator can shift the set position of the origin G to a proper position by moving the recording paper 14 in the vertical feed direction or by moving the carriage 30 in the longitudinal direction through operation of the paper feed keys 62, 64 or the pen travel keys 66, 68.

In the instant embodiment which has been described, the recording origin G is set at a lower left position relative to the circular, bar or broken-line graph E, H, i.e., spaced from the graph by predetermined distances along the vertical and horizontal axes (in the paper feeding and carriage moving directions), and the data for the non-recording movements of the pen 16 for checking the actual recording paths is prepared so that the pen 16 is moved from the origin G so as to indicate the recording range in which the desired graph is drawn according to the input data. The observation of the non-recording movement of the pen 16 permits the operator to set the recording origin at a suitable position on the recording sheet 14 so that the graph is positioned with sufficient spaces relative to the other recordings on the recording paper 14. Further, since the origin G is set at a lower left position relative to the graph, the bottom of the recording paper 14 can be checked without a paper end mechanism.

In the preferred embodiment as described above, the data for indicating the size of the rectangle R may be prepared so that the non-recording feed movement of the ball-point pen 16 is performed with respect to the recording paper 14 along two opposite sides of the rectangle R or a diagonal line which does not pass the origin G. In short, data for the non-recording feed operation of the ball-point pen 16 may be created in any desired form if the paths taken by the pen 16 based on the non-recording data represents the actual size of the circle E, or the rectangle R which encloses the recording area.

Figure 14:
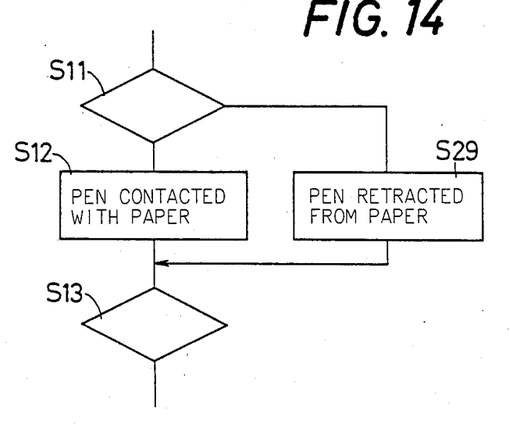
FIG. 14 is a part of flowchart in another embodiment of the present invention.

Referring to FIG. 14, another embodiment of the invention will be described.

In the above described embodiment, the non-recording feed operation of the ball-point pen 16 prior to the actual recording operation is effected to indicate the recording range determined by the recording-range setting routine in the step S30. However, the recording range check routine in the above mentioned step S30 of FIG. 4A may be removed. That is, the step S29 of FIG. 4A is followed by the step S13 and the subsequent steps. In this case, too, the ball-point pen 16 and recording paper 14 are moved relative to each other, with the pen 16 kept away from the paper 14, in the steps S13 and subsequent in the same manner as in the actual recording operation as previously discussed, whereby the operator can check the actual dimension of the graph or picture to be drawn prior to starting the recording operation. The locus of the ball-point pen 16 described during the non-recording movements represents the actual size of the circle E, or the rectangle R which encloses the actual recording area. In this embodiment wherein the non-recording feed paths are the same as those in an actual recording operation, a program for determining the recording range and non-recording data for non-recording feed operation, and a storage location for storing such program and data are not required.

While the present invention has been described in its preferred embodiment, it is to be understood that the invention is not limited thereto, but various changes and modifications may be made to the invention without departing from the spirit and scope of the invention.

What is claimed is:

1. A recording apparatus having a paper support for supporting a recording sheet of paper, a paper feed unit for feeding the sheet of paper in opposite directions, a carriage supporting a writing instrument and movable in a direction perpendicular to a line of feed of said sheet of paper, a carriage drive unit for moving said carriage in said direction, a writing-instrument drive unit for moving the writing instrument between a recording position in which the writing instrument is in contact with the surface of said sheet of paper, and a non-recording position in which the writing instrument is spaced away from said surface of the paper, and a control unit for drawing a graphical representation by means of relative movements of said carriage and said sheet of paper with the writing instrument held in said recording position, based on input recording data representative of said graphical representation, wherein the improvement comprises:

said control unit including memory means for storing said input recording data, means for preparing non-recording data representative of paths of relative non-recording movements between the writing instrument and the sheet of paper, and control means for activating said paper feed unit and said carriage drive unit, according to said non-recording data, to effect said relative non-recording movements with said writing instrument held in said non-recording position, said preparing means preparing said non-recording data based on said input recording data such that said paths indicate a recording area in which said graphical representation is drawn by said writing instrument, said recording data area indicated by said paths being larger than said graphical representation, whereby an operator can check dimensions and location of said recording area before the graphical representation is actually drawn on said sheet of paper.

2. The recording apparatus of claim 1, further comprising a mode selector key for selecting a writing mode in which characters are written by said writing instrument, or a recording mode in which the graphical representation is drawn, and further comprising a check key for effecting said non-recording relative movements, and wherein said control means being responsive to the operation of said check key in said recording mode, and activating said paper feed unit and said carriage drive unit for effecting said relative non-recording movements.

3. The recording apparatus of claim 1, wherein said control means controls said drive units such that said paths of the relative non-recording movements are taken along a diagonal line of a rectangle which encloses said recording area.

4. The recording apparatus of claim 1, wherein said control means controls said drive units such that said paths of the relative non-recording movements are taken along four sides of a rectangle which encloses said recording area.

5. The recording apparatus of claim 1, wherein said control means controls said drive units such that said paths of the relative non-recording movements are taken along two adjacent sides of a rectangle enclosing said recording area, said two adjacent sides defining at their intersecting point an origin of recording of said graphical representation.

6. The recording apparatus of claim 1, further comprising a graph type selector key for selecting one of plural types of graphs including a pie chart, said control means controls said paper feed unit and said carriage drive unit, upon selection of said pie chart by said selector key, such that said paths of the relative non-recording movements comprise a first path along a straight line connecting an origin of recording and a center of said pie chart, a second path along a straight line connecting said center and a point on the circumference of the pie chart, and a third path along said circumference.

* * * * *